US012654565B2

(12) United States Patent
Bittner

(10) Patent No.: US 12,654,565 B2
(45) Date of Patent: Jun. 16, 2026

(54) METHOD FOR DRIVING AT LEAST ONE AXLE OF A VEHICLE

(71) Applicant: AUDI AG, Ingolstadt (DE)

(72) Inventor: Florian Bittner, Gaimersheim (DE)

(73) Assignee: Audi AG, Ingolstadt (DE)

( * ) Notice: Subject to any disclaimer, the term of this patent is extended or adjusted under 35 U.S.C. 154(b) by 117 days.

(21) Appl. No.: 18/425,920

(22) Filed: Jan. 29, 2024

(65) Prior Publication Data

US 2024/0253475 A1    Aug. 1, 2024

(30) Foreign Application Priority Data

Jan. 31, 2023    (DE) .......................... 102023102323.3

(51) Int. Cl.
 *B60L 15/20* (2006.01)
(52) U.S. Cl.
 CPC ................................ *B60L 15/2045* (2013.01)
(58) Field of Classification Search
 CPC .................................................. B60L 15/2045
 USPC ......................................................... 701/22
 See application file for complete search history.

(56) References Cited

U.S. PATENT DOCUMENTS

| | | | | | |
|---|---|---|---|---|---|
| 5,549,172 | A | * | 8/1996 | Mutoh | B60L 15/20 |
| | | | | | 180/65.6 |
| 6,672,415 | B1 | * | 1/2004 | Tabata | B60K 6/32 |
| | | | | | 903/910 |

| | | | | | |
|---|---|---|---|---|---|
| 7,870,925 | B2 | * | 1/2011 | Perakes | B60W 20/10 |
| | | | | | 180/243 |
| 8,892,288 | B2 | * | 11/2014 | Derflinger | B60L 15/2045 |
| | | | | | 701/87 |
| 9,744,879 | B2 | * | 8/2017 | Drako | B60L 3/102 |
| 9,878,638 | B2 | | 1/2018 | Wein et al. | |
| 10,124,698 | B2 | | 11/2018 | Martin | |
| 10,843,576 | B2 | * | 11/2020 | Fujiyoshi | B60L 15/2009 |
| 11,420,613 | B1 | * | 8/2022 | David | B60K 6/365 |
| 11,529,869 | B2 | * | 12/2022 | David | B60K 17/36 |
| 11,607,952 | B1 | * | 3/2023 | Wright | B60K 17/356 |
| 11,909,346 | B2 | * | 2/2024 | Ono | H02K 11/33 |
| 12,221,091 | B2 | * | 2/2025 | Boudreau | B60W 20/30 |
| 2004/0040375 | A1 | * | 3/2004 | Kadota | B60K 6/00 |
| | | | | | 903/902 |

(Continued)

FOREIGN PATENT DOCUMENTS

| | | |
|---|---|---|
| DE | 102005026874 A1 | 12/2006 |
| DE | 102013007354 A1 | 10/2014 |
| EP | 3132966 A1 | 2/2017 |

*Primary Examiner* — Luis A Martinez Borrero
(74) *Attorney, Agent, or Firm* — Seed Intelletual Property Law Group LLP

(57) ABSTRACT

A method for driving wheels of at least one axle of a vehicle may include dictating a setpoint for a torque to be provided by at least one drive unit for a given operating range, verifying a driving mode in which a better efficiency is achieved for the given operating range, and driving the wheels in the driving mode in which the better efficiency is achieved. The at least one drive unit may be selected from a first drive unit and a second drive unit. The first and second drive units may be associated with the at least one axle. The driving mode may be selected from a first driving mode and a second driving mode. The wheels in the first driving mode may be driven by the first drive unit. The wheels in the second driving mode may be driven by the first and second drive units.

9 Claims, 3 Drawing Sheets

(56) References Cited

U.S. PATENT DOCUMENTS

| | | | | |
|---|---|---|---|---|
| 2004/0210356 | A1* | 10/2004 | Wilton | B60L 58/14 |
| | | | | 701/22 |
| 2004/0263099 | A1* | 12/2004 | Maslov | B60L 50/20 |
| | | | | 318/400.24 |
| 2005/0052080 | A1* | 3/2005 | Maslov | H02K 16/04 |
| | | | | 307/10.1 |
| 2007/0193808 | A1* | 8/2007 | Perakes | B60W 10/02 |
| | | | | 180/65.265 |
| 2010/0222953 | A1* | 9/2010 | Tang | B60L 15/20 |
| | | | | 701/22 |
| 2010/0317485 | A1* | 12/2010 | Gillingham | B60K 17/356 |
| | | | | 180/242 |
| 2011/0307130 | A1* | 12/2011 | Gow | B60L 3/102 |
| | | | | 701/22 |
| 2012/0184379 | A1* | 7/2012 | Christini | B62M 23/00 |
| | | | | 464/46 |
| 2013/0174536 | A1* | 7/2013 | Yacoub | B60W 20/40 |
| | | | | 60/274 |
| 2014/0121870 | A1* | 5/2014 | Lee | B60W 30/16 |
| | | | | 477/3 |
| 2014/0195079 | A1* | 7/2014 | Derflinger | B60L 50/61 |
| | | | | 701/22 |
| 2014/0228168 | A1* | 8/2014 | Kaufman | B60W 20/13 |
| | | | | 180/65.265 |
| 2015/0210266 | A1* | 7/2015 | Yang | B60K 6/387 |
| | | | | 180/65.23 |
| 2016/0264019 | A1* | 9/2016 | Drako | B60K 17/356 |
| 2016/0325732 | A1* | 11/2016 | Yang | B60K 6/442 |
| 2017/0174097 | A1* | 6/2017 | Gillespey | B60L 3/12 |
| 2019/0092180 | A1 | 3/2019 | Zhu | |
| 2019/0126759 | A1* | 5/2019 | Miller | B60L 7/18 |
| 2021/0152105 | A1* | 5/2021 | Froelich | B60L 58/21 |
| 2021/0170870 | A1* | 6/2021 | Oh | B60K 17/354 |
| 2021/0197778 | A1 | 7/2021 | Shi et al. | |
| 2021/0354566 | A1* | 11/2021 | Ben-Ari | B60T 1/10 |
| 2021/0402982 | A1* | 12/2021 | Verbridge | B60W 30/02 |
| 2022/0144058 | A1* | 5/2022 | Ben-Ari | F16D 1/10 |
| 2022/0324333 | A1* | 10/2022 | David | B60K 1/02 |
| 2022/0355677 | A1* | 11/2022 | David | B60L 15/20 |
| 2022/0410684 | A1* | 12/2022 | Wang | B60K 23/04 |
| 2023/0046751 | A1* | 2/2023 | Boudreau | B60L 15/2036 |
| 2023/0080481 | A1* | 3/2023 | Arun | B60K 17/3515 |
| | | | | 701/67 |
| 2023/0202561 | A1* | 6/2023 | Dowdell | B60K 7/0007 |
| | | | | 180/6.5 |
| 2023/0396192 | A1* | 12/2023 | Bittner | B60L 3/0061 |
| 2025/0153704 | A1* | 5/2025 | Boudreau | B60W 20/20 |

* cited by examiner

METHOD FOR DRIVING AT LEAST ONE AXLE OF A VEHICLE

CROSS-REFERENCE TO RELATED APPLICATIONS

This application claims priority from German Patent Application No. 102023102323.3, filed on Jan. 31, 2023, which is hereby incorporated by reference in its entirety.

BACKGROUND

Technical Field

Embodiments of the invention relate to a method for driving at least one axle of a vehicle and a drive system.

Description of the Related Art

DE 10 2013 007 354 A1 discloses a method for driving a drive device of a motor vehicle.

A method for operating an electrical charging and drive system is disclosed in U.S. patent Publication No. 2019/0092180 A1.

U.S. patent Publication No. 2021/0197778 A1 discloses a traction control system for an electric motor vehicle.

Given this background, there may exist a desire to efficiently drive the wheels on an axle of a vehicle.

BRIEF SUMMARY

Embodiments of the present disclosure may provide an improved concept in connection with a method and a drive system for efficiently driving the wheels on axles of a vehicle as described herein.

Embodiments of the present disclosure may include a method for the driving and/or moving of the wheels of at least one axle of a vehicle, such as a motor vehicle, wherein the at least one axle or each axle may be associated with two wheels, one wheel at one end of the at least one axle, and two drive units. The wheels, which may include two wheels, are driven (i.e., moved) in a primary driving mode by only one drive unit and/or in a secondary driving mode by both drive units of the at least one axle concurrently. In a given operating range (i.e., in a given operating situation of the vehicle), a setpoint for a torque to be provided (i.e., generated) by at least one drive unit is dictated, and a verification is made to determine the driving mode for the given operating range in which better efficiency may be achieved. The wheels of the at least one axle are driven in that driving mode of the two driving modes for which better efficiency may be achieved in the given operating range, and which may be more energetically favorable in such an operating range.

In some embodiments, a first amount of energy, which may be required in the given operating range in the primary driving mode for the at least one axle, and a second amount of energy, which may be required in the given operating range in the secondary driving mode for the at least one axle, may each be determined and the efficiency and/or the energy of the first and second amounts of energy may be compared.

In some embodiments, the torque which may be provided by the at least one drive unit of the at least one axle for a respective operating range among different possible operating ranges of the vehicle for each of the two driving modes may be ascertained prior to the operating ranges being carried out. For example, prior to a future operating situation, a target value for the torque which may be provided by the at least one drive unit of the at least one axle for a respective operating range may be determined for each of the two driving modes.

Accordingly, the first amount and the second amount of energy may be determined prior to the driving of the wheels on the at least one axle and thus the driving of the vehicle in the given future operating range or the operating range to be carried out in future. Which driving mode of the at least one axle which may be energetically more favorable in the given operating range may be determined in advance.

The operating range may depend on at least one time-dependent and/or dynamically variable kinematic parameter of the vehicle. For example, the time-dependent and/or dynamically variable kinematic parameter of the vehicle may include a location or position, a velocity, an acceleration of the vehicle, the trajectory traveled or planned for the vehicle. The operating range may also depend on the gravity of the earth, the topography in the operating range of the distance being traveled by the vehicle, and/or at least one component parameter, such as a rotary speed and/or temperature of at least one component, such as the at least one drive unit, for the driving of the vehicle. The operating range for which one of the driving modes will be selected for the at least one axle may also depend on requirements for the dynamics of the vehicle, on requirements for the stability of the vehicle, and/or on acoustical requirements for the drive system.

In some embodiments of the method, the torque may be determined in advance for the given operating range, for example, prior to a lengthy operation and/or a trip to be performed by the vehicle. The torque may be determined by measurement and/or simulation for each respective operating range of the different possible modeled and/or modelable operating ranges of the vehicle for each of the two driving modes of the at least one axle. The determined torque may be stored in a first characteristic map for the torque, representing the torque as a function of the rotary speed. Multiple characteristic curves may be plotted in the characteristic map, such that each characteristic curve is provided for a constant efficiency and is formed as an isoline. At least some of the characteristic curves may be closed curves.

A center line may be drawn through the characteristic curves having the best efficiency, such that the center line running through the characteristic curves divides the characteristic map into two regions for the torque. A first region may be below the center line and a second region may be above the center line. A value of the torque for a given rotary speed in the first region may be generally lower in magnitude than that in the second region. The center line may be drawn through the characteristic curves automatically and may be plotted virtually. Furthermore, one of the two possible driving modes may be selected depending on a positioning of an operating point for the vehicle in the characteristic map relative to the center line, i.e., whether the operating point lies in the first region, in the second, or on the center line. The primary driving mode may be selected when the operating point for a positive torque lies in the first region below the center line and/or on the center line. Alternatively, the secondary operating mode may be selected when the operating point for the positive torque lies in the second region above the center line.

In order to provide the center line, a value of torque for each value of the rotary speed having a respective maximum efficiency may be determined for several values of the rotary speed in the characteristic map. An auxiliary point resulting from the values for the rotary speed and the torque may be created at each of the several values of the rotary speed in the characteristic map. The center line will be drawn through the auxiliary points to connect the auxiliary points with the respective maximum efficiency. The center line may be drawn, at least in part, by interpolation.

Accordingly, in each possible operating range for each of the two driving modes, the amount of required energy may be ascertained in advance by measurement and/or simulation and stored in a second characteristic map for the energy. The driving mode in which the smaller amount of energy is required for the given operating range may be selected in advance, such as before the vehicle is operated in the given operating range with the torque as determined.

In some embodiments, only one drive unit of the two drive units may be activated in the primary driving mode at a particular point in time, and the other drive unit of the two drive units may be deactivated. The deactivated drive unit may be dragged by the activated drive unit and/or may be operated in freewheeling or idle duty. In some embodiments, the wheel of the two wheels which is associated with the activated drive unit may be driven by the activated drive unit directly, while the other wheel may be driven by the wheel associated with the activated drive unit automatically and passively. The deactivated drive unit may be dragged by the entrained wheel associated with the activated drive unit. If the drive units are fashioned as electric machines, each activated drive unit may be energized and supplied with electric energy from a battery of the vehicle. Electrical energy may be actively transformed into mechanical energy by virtue of electromagnetic induction and the drive units may operate as an electric motor. In the primary driving mode, the deactivated drive unit may be free of current, and the deactivated drive unit may co-rotate without converting electric energy into mechanical energy. Alternatively or additionally, the deactivated drive unit may be driven passively and operated as an electric generator to convert mechanical into electric energy, which may be stored in the battery, such that a recuperation may be carried out.

Furthermore, in the primary driving mode, activation may switch back and forth between the two drive units, such that only one of the two drive units will be activated during an action period and the other drive unit will be deactivated at all times. A switching frequency may be considered when switching between the two drive units. The switching frequency and/or the action period may be dependent on a component parameter of the drive units. For example, the control parameter of the drive units may be a temperature of the drive units. In some embodiments, the switching frequency and/or the action period may be configured to cause the two drive units reach the same temperature if the temperatures of the drive units were initially different from each other. The two drive units may be activated and deactivated for equal portions of during which the vehicle is operating in the given operating range.

The method may be applied to only one axle of the vehicle, such as the front or rear axle of the vehicle. At least one of the front and rear axles of the vehicle may include two wheels and two drive units thereon in embodiments in which the method is applied to only one axle of the vehicle. In embodiments in which the method is applied to multiple axles of the vehicle (e.g., two axles of the vehicle) each axle may include two wheels and two drive units thereon in an axle-spanning manner. One of the two driving modes will be executed on the at least one axle in the respective operating range which achieves the better efficiency for the torque being provided and which requires the lesser amount of energy in the particular configuration. If the method is executed for only one axle, either only one drive unit or both drive units may be activated and only one axle may be used for driving these drive units. If the method is executed for two axles, the same driving mode may be executed for both axles, depending on the operating range. However, the primary driving mode may be executed for one of the two axles and the secondary driving mode may be executed for the other axle. In some embodiments, the primary or the secondary driving mode may be executed for one of the two axles and the two drive units of the other axle may be deactivated. In such embodiments, the torque may be distributed among wheels of one axle and/or between the axles (i.e., between at least two wheels of different axles).

Moreover, the torque may be generated by at least one drive unit in a respective driving mode and transmitted to at least one wheel of the wheels of the at least one axle. In such embodiments, the torque for the given operating range in the primary driving mode may be transmitted from the or activated drive unit to the wheels of the at least one axle. In the secondary driving mode, the torque for the given operating range may be transmitted from both activated drive units to the wheels of the at least one axle.

In some embodiments, the entire torque which is generated by at least one drive unit in a respective driving mode may be distributed among the wheels of the at least one axle. The distribution of the torque may be uniform and simultaneous among the wheels of the at least one axle when the vehicle is moving in a straight-line. In the primary driving mode, the entire torque of the only one active drive unit may be distributed among the wheels of the at least one axle. In the secondary driving mode, the torque of both active drive units may be distributed among the wheels of the at least one axle.

Alternatively or additionally, the entire torque which is generated by at least one drive unit in a respective driving mode, may be distributed to a different extent among the wheels at a respective time. For example, at least one left wheel at the left end of the at least one axle and at least one right wheel at the right end of the at least one axle may receive differing amount of torque, which may occur during travel around a curve. In such embodiments, the vehicle may be steered by distributing the torque between at least one left wheel and at least one right wheel.

The torque may depend on the rotary speed of at least one wheel and/or at least one drive unit.

The drive system described herein may be utilized with at least one axle of a vehicle. The at least one axle may be associated with two wheels and two drive units, while the two wheels of the at least one axle may be driven by only one drive unit in a primary driving mode and by both drive units in a secondary driving mode. The drive system may include a computing unit and the drive units of the at least one axle. The computing unit may be configured to dictate a setpoint for a torque which is to be provided by at least one drive unit for a given operating range (i.e., a given operating situation of the vehicle). The torque may be provided by only by one drive unit or by both drive units. The computing unit may further be configured to determine the driving mode of the two possible driving modes for the at least one axle which achieves better efficiency in the given operating range, to select the driving mode with the better efficiency, and to drive the wheels of the at least one axle in the respective selected driving mode and/or to arrange for the wheels to be driven in the respective selected driving mode for which a better efficiency is achieved in the given operating range, and which will be favored energetically in its configuration.

The drive system described herein may be utilized in the method described herein. The computing unit may be configured to determine the required first amount of energy for the driving of the wheels of the at least one axle in the given operating range with the primary driving mode, to determine the required second amount of energy for the driving of the wheels of the at least one axle in the given operating range with the secondary driving mode, to compare the two amounts of energy, and, while also considering the torque to arrange for the driving of the wheels of the at least one axle in that driving mode of the two possible driving modes which is be energetically more favorable in the given operating range.

Each drive unit may comprise an electric machine and an inverter configured to adjust at least one electrical component parameter, such as the current and/or the voltage, of the respective drive unit. Each drive unit may also be configured as an electric machine having an inverter. The at least one electrical component parameter may be set automatically and may be regulated according to the driving mode. For example, in the primary driving mode, only the at least one electrical component parameter for the active drive unit may be regulated. In a further example, in the secondary driving mode, the at least one electrical component parameter for both drive units of the at least one axle may be regulated. The at least one electrical component parameter for both drive units of the at least one axle may be regulated in a joint and/or coordinated manner.

In some embodiments, the drive units may be identical in design. In some embodiments, each drive unit which is associated with at least one axle may be arranged in, on and/or at the respective axle next to a wheel. In some embodiments, each drive unit may be arranged in a wheel hub of a respective wheel.

In some embodiments, the two drive units for the at least one axle, may form a dual drive for that axle. In some embodiments, a wheel hub of a wheel may be configured as a component of the respective axle at a respective end of the axle. An efficiency mode may be implemented by selecting one of the two driving modes for the given operating range for the vehicle with the dual drive for the at least one axle. In such embodiments, the driving mode of the two driving modes which is better in terms of at least one of torque, efficiency, and/or energetically for the at least one axle in the respective given operating range may be selected. Such a configuration reduces the cumulative consumption of electric energy by the drive units.

In some embodiments, a higher-level computing unit or a corresponding controller, such as a drive controller, may dictate a setpoint for the torque in the operating range or in an operating mode for at least one drive unit. The setpoint of the torque may correspond to only one drive unit or a setpoint may correspond to an overall cumulative torque for both drive units. In advance, i.e., prior to the driving of the vehicle, a determination may be made regarding whether the primary driving mode or the secondary driving mode is more efficient with regard to energy for each operating range of multiple possible operating ranges. For example, the determination may be made on a test stand, during a trial run, by simulation, and/or by measurement. The determination may also be made in dependence on boundary conditions of the setpoint of the torque and the temperature of at least one drive unit. The determination may find the primary driving mode is more efficient for this operating range, such that the complete torque is to be provided by only one of the two drive units of the at least one axle, or the determination may find the secondary driving mode is more efficient such that the torque is to be provided by both drive units, i.e., by each drive unit of the at least one axle providing 50% of the torque. In the primary driving mode with only one drive unit per axle activated, only the active drive unit may be connected temporarily to the battery at the respective time to be energized by the battery. In some embodiments, the activated drive unit may be connected to the battery automatically. The activated drive unit's inverter may be clocked. The inactive drive unit may be temporarily disconnected from the battery, such that the inactive drive unit is not being energized by the battery, and its inverter may not be clocked. In some embodiments, the inactive drive unit may be disconnected from the battery automatically. The respective drive unit may be connected across a controller and/or a switch to the battery. The controller and/or switch being configured to connect the drive unit to the battery upon activation, or to switch on the drive unit, and to disconnect the drive unit from the battery or to switch off the drive unit upon deactivation. Such a configuration may reduce electromagnetic losses of at least one electric machine in the respective operating range depending on the selected driving mode. For example, electromagnetic losses may be reduced for only one active electric machine in the primary driving mode or electromagnetic losses may be reduced for both active electric machines in the secondary driving mode.

The setpoint for the torque of at least one drive unit can be dictated during a presetting phase prior to driving the vehicle in the given operating range. The setpoint for only one drive unit as well as that for both drive units may be dictated prior to driving the vehicle in the given operating range. The presetting phase may last for several seconds, such as 10 seconds, or at least one minute, such as 60 seconds. The presetting phase may occur when the vehicle is at least partially assisted, controlled, and/or regulated autonomously during actual use prior to driving in the given operating range, such as by adaptive cruise control (ACC) for the vehicle. During the assisted and/or autonomous driving, the future torque or its setpoint may be predictable for the intended given operating range.

The target values for the torque may be set equally for the alternative driving units in the primary driving mode. Each target value may correspond to the setpoint for the torque. Furthermore, an actual value for the torque may result from the torque of the particular activated drive unit providing the target value for both wheels, which may be less than the target value which has been set, as both wheels are to be driven and/or moved with the torque which has been set. In this case, it is possible for the target value to be set greater than the setpoint and for the resulting actual value to correspond to the intended setpoint.

In the secondary driving mode, each time a target value can be set for the torque for both simultaneously activated dive units, the two target values may be generally equal to each other and their sum may correspond to the setpoint.

An efficiency mode may be activated for a particular operating range of the vehicle by selecting the driving mode. The method may be implemented for only one axle, i.e., a front or a rear axle of the vehicle internally in the axle, or for multiple. The torque may be distributed specifically between the axles (i.e., torque vectoring).

The features described above and those described below throughout the specification may be used not only in the particular indicated combination, but also in other combinations or standing alone, without leaving the scope of the present disclosure.

DETAILED DESCRIPTION

Figures 1, 2:
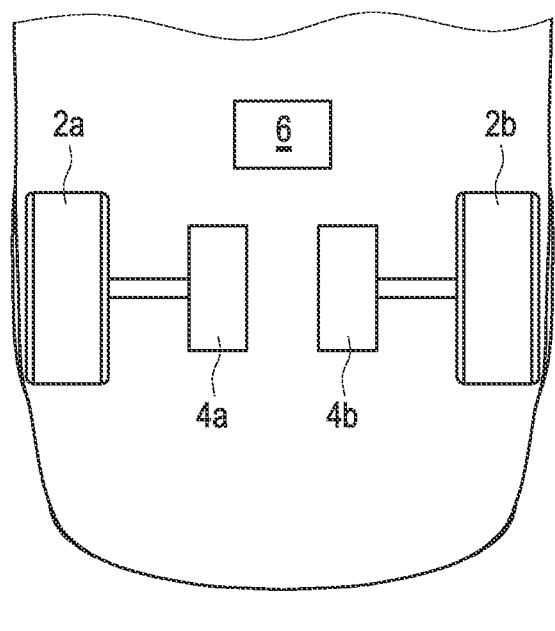
FIG. 1 shows a schematic representation of an axle of a vehicle including a first example embodiment of a drive system.
FIG. 2 shows a schematic representation of an axle of a vehicle including a second example embodiment of a drive system.

A first embodiment of the drive system according to the present disclosure for the first axle of the vehicle is shown in FIG. 1 and may comprise a left and a right wheel 2a, 2b, having two wheel-adjacent drive units 4a, 4b between the two wheels 2a, 2b and a computing unit 6 for controlling the drive system in accordance with an embodiment of the method according to the present disclosure. The vehicle may be configured as a motor vehicle.

A second embodiment of the drive system according to the present disclosure for the second axle of the vehicle is shown in FIG. 2 and may comprise a left and a right wheel 12a, 12b, and a computing unit 16 for controlling the drive system in accordance with an embodiment of the method according to the present disclosure. Each of the left and right wheels 12a, 12b may be a wheel-internal drive unit 14a, 14b or a wheel-hub drive unit 14a, 14b. The vehicle may be configured as a motor vehicle.

In both embodiments shown in FIGS. 1 and 2, two drive units 4a, 4b, 14a, 14b are provided for each axle, forming a dual drive of the respective axle. For the driving of the two wheels 2a, 2b, 12a, 12b of the axle in a given operating range from among several possible operating ranges, the two wheels 2a, 2b, 12a, 12b may be driven respectively in a primary driving mode by only one drive unit 4a, 4b, 14a, 14b and in a secondary driving mode by both drive units 4a, 4b, 14a, 14b. Moreover, for the given operating range of the vehicle, a setpoint may be dictated for a torque which may be provided by at least one drive unit, and the computing unit 6, 16 may be configured to confirm which driving mode achieves better efficiency for the given operating range.

Figure 3:
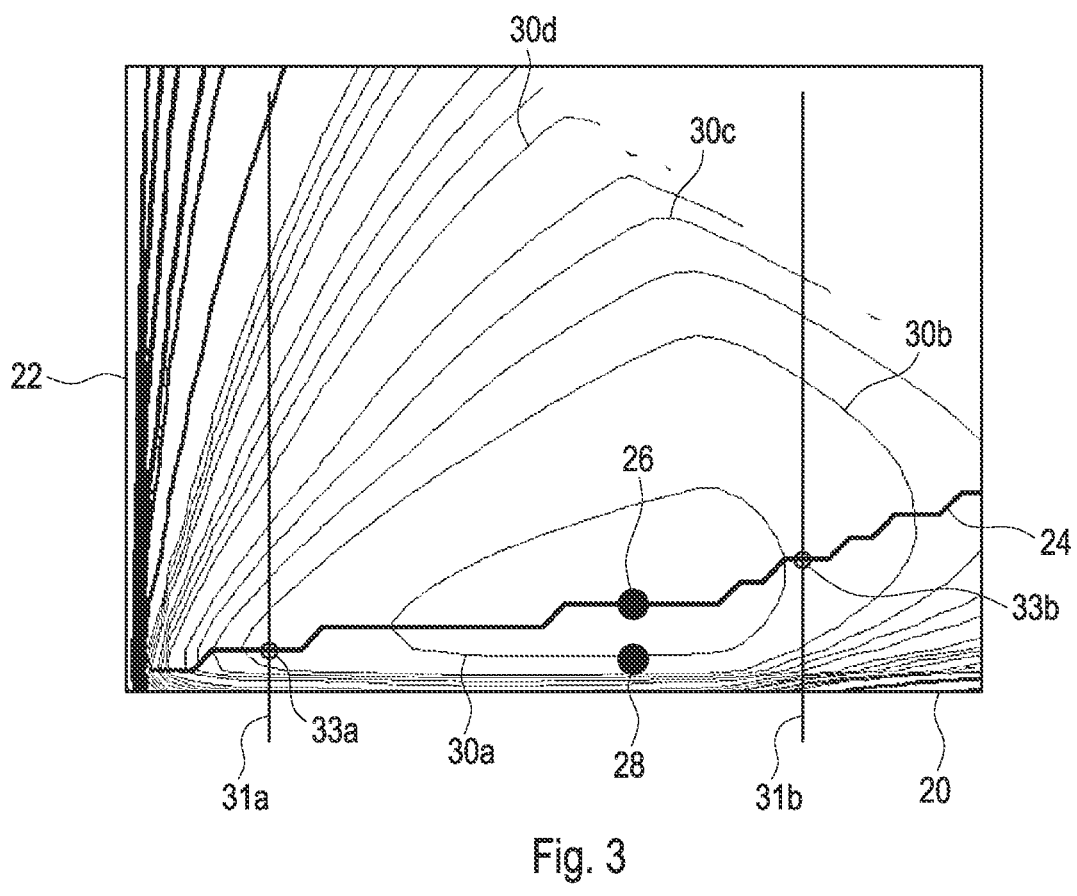
FIG. 3 shows a chart of a characteristic map according to an example embodiment of a method of driving wheels of an axle.

The diagram shown in FIG. 3, which applies to one proposed drive system during the implementation of the method according to the present disclosure, may be used by the computing unit 6, 16 to confirm which driving mode achieves better efficiency for the given operating range. It is assumed here that the vehicle is moving each time on a straight line.

This diagram of FIG. 3, shown as a cartesian coordinate system, comprises an abscissa 20, along which the rotary speed of the drive units 4a, 4b, 14a, 14b and/or the wheels 2a, 2b, 12a, 12b of the axle is plotted in revolutions per minute, and an ordinate 22, along which the torque of the drive units 4a, 4b, 14a, 14b and/or the wheels 2a, 2b, 12a, 12b is plotted in Newton-meters. When the vehicle travels on a curve, the rotary speeds of the two wheels 2a, 2b, 12a, 12b and/or drive units 4a, 4b, 14a, 14b may differ from each other.

The diagram of FIG. 3 encompasses a characteristic map with multiple characteristic curves 30a, 30b, 30c, 30d for different efficiencies of a possible operating range. Each characteristic curve 30a, 30b, 30c, 30d is shown as an isoline describing the torque for constant efficiency as a function of the rotary speed. At least some of the characteristic curves may be closed curves. Furthermore, the diagram may contain a center line 24 representing the best efficiency, which divides up the characteristic map into a first region below the center line 24 and a second region above the center line 24.

In order to provide the center line 24, several different values for the rotary speed may be selected, for example along the abscissa 20. Next, through each of these values for the rotary speed a straight line 31a, 31b is drawn, parallel to the ordinate 22, and intersecting the characteristic curves 30a, 30b, 30c, 30d. Along each straight line 31a, 31b the torque value, and thus a corresponding auxiliary point 33a, 33b, on the straight line 31a, 31b for which the efficiency is maximal is determined. The center line 24 is then drawn through all auxiliary points 33a, 33b on the straight lines 31a, 31b. The center line 24 may include several plateaus for multiple values of the rotary speed that are connected, for example, by interpolation.

The center line 24 shows for each rotary speed the torque with the best efficiency. Furthermore, for a value x of the rotary speed, there lies a first operating point 26 for a first determined value of the torque, such as a setpoint, $y_1$, on the center line 24 and a second operating point 28 for a second determined value, such as a setpoint, $y_2$, in the primary region below the center line 24. In the example embodiment shown in FIG. 3, the second determined value, $y_2$, is half as large as the first determined value, $y_1$. For the value x of the rotary speed at the first operating point 26, a first efficiency in the primary driving mode for the respective solely activated drive unit 4a, 4b, 14a, 14b may be present with the torque value $y_1$. For the value x of the rotary speed at the second operating point 28, a second efficiency in the secondary driving mode for both synchronously activated drive units 4a, 4b, 14a, 14b may be present with the respective torque value $y_2$. In the example embodiment shown in FIG. 3, the second torque value $y_2$ is smaller in magnitude than the first value $y_1$.

In some embodiments of the method, the primary driving mode will be selected with only one active drive unit 4a, 4b, 14a, 14b for operating points 28 lying in the primary region and for which the demanded setpoint for the torque of the wheels 2a, 2b, 12a, 12b of the axle is equal in magnitude or less than a setpoint on the center line 24. On the other hand, the secondary driving mode will be selected for operating points in the secondary region for which the demanded setpoint of the torque is greater in magnitude than a setpoint on the center line 24. In some embodiments, the characteristic curves 30a, 30b, 30c, 30d, each having constant efficiency for the vehicle, may be determined in advance, dependent upon the energy efficiency, the driving stability, and/or the acoustics of the vehicle, by tests and/or simulation. Accordingly, a center line 24 may be determined in dependence on such tests and/or simulation.

At the second operating point 28 and when in the primary driving mode, the entire required torque of the value $y_2$ will be provided consistently by an activated drive unit 4a, 4b, 14a, 14b while the other respectively deactivated drive unit 4a, 4b, 14a, 14b will be dragged or switched to freewheeling. An inverter of the respective deactivated drive unit 4a, 4b, 14a, 14b will no longer be clocked and thus no electro-magnetic losses will occur in the inverter and little or no electromagnetic losses will occur in the electric machine of the respective deactivated drive unit 4a, 4b, 14a, 14b.

The diagram shown in FIG. 3 illustrates the dependency of a positive torque on a positive rotary speed in a first quadrant, such that the electric machine is operated by at least one respectively activated drive unit as an electric motor and is positively driven. In a further fourth quadrant of the cartesian coordinate system of FIG. 3, not shown here, where the dependency of a negative torque on the positive rotary speed may be shown, the electric machine may be operated, braked, and/or negatively driven by at least one respectively deactivated drive unit, at least in the primary driving mode, as an electric generator. In some embodiments, the characteristic curves 30a, 30b, 30c, 30d and the center line 24 on the abscissa 20 of the characteristic map may be practically mirrored, and the positive values and negative values of the torque may be proportional, taking into account a positive or negative factor, such as +1 or −1. In such embodiments, the two regions and the operating points 26, 28 may be mirrored accordingly. For the selection of one of the two driving modes in such embodiments, the primary driving mode may be selected if the mirrored operating point 26, 28 lies in the mirrored first region above or on the mirrored center line 24, while the secondary driving mode will be selected if a mirrored operating point 26, 28 lies below the mirrored center line 24.

If a drive unit 4a, 4b, 14a, 14b is or becomes activated during an action period, an optionally constant torque with a target value set greater than zero may be provided by the activated drive unit during this period, while the torque of a deactivated drive unit 4a, 4b, 14a, 14b may be equal to or less than zero.

Figure 4:
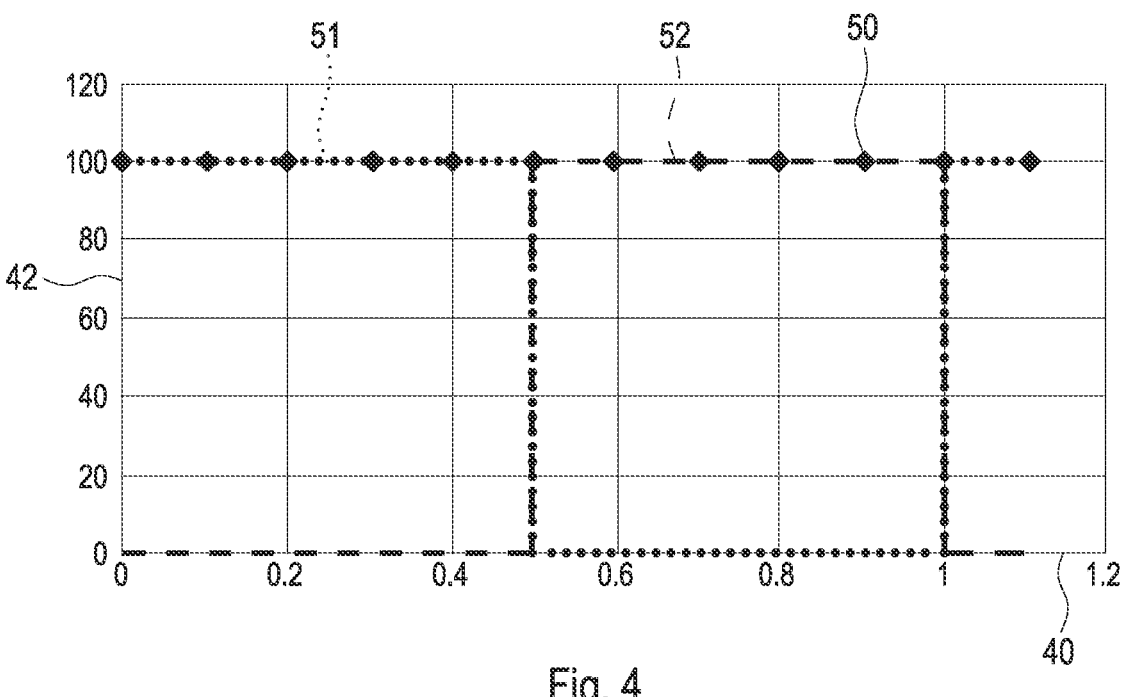
FIG. 4 shows a diagram including a first variant of torque curves.
Figure 5:
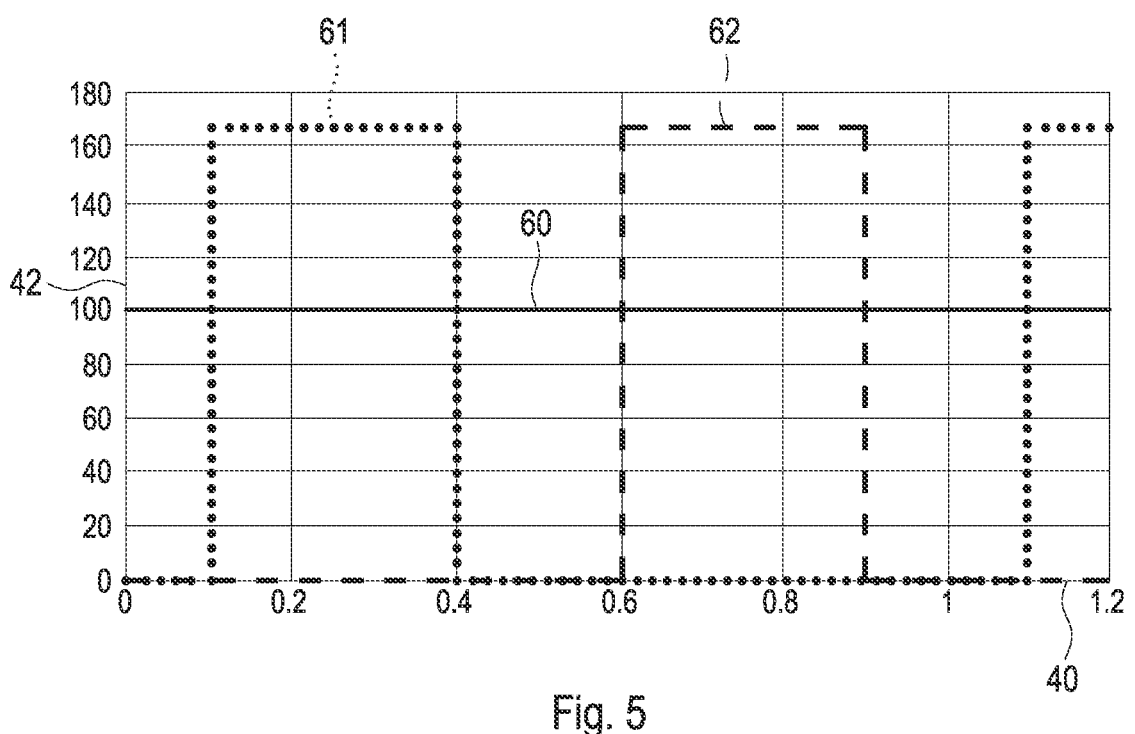
FIG. 5 shows a diagram including a second variant of torque curves.
Figure 6:
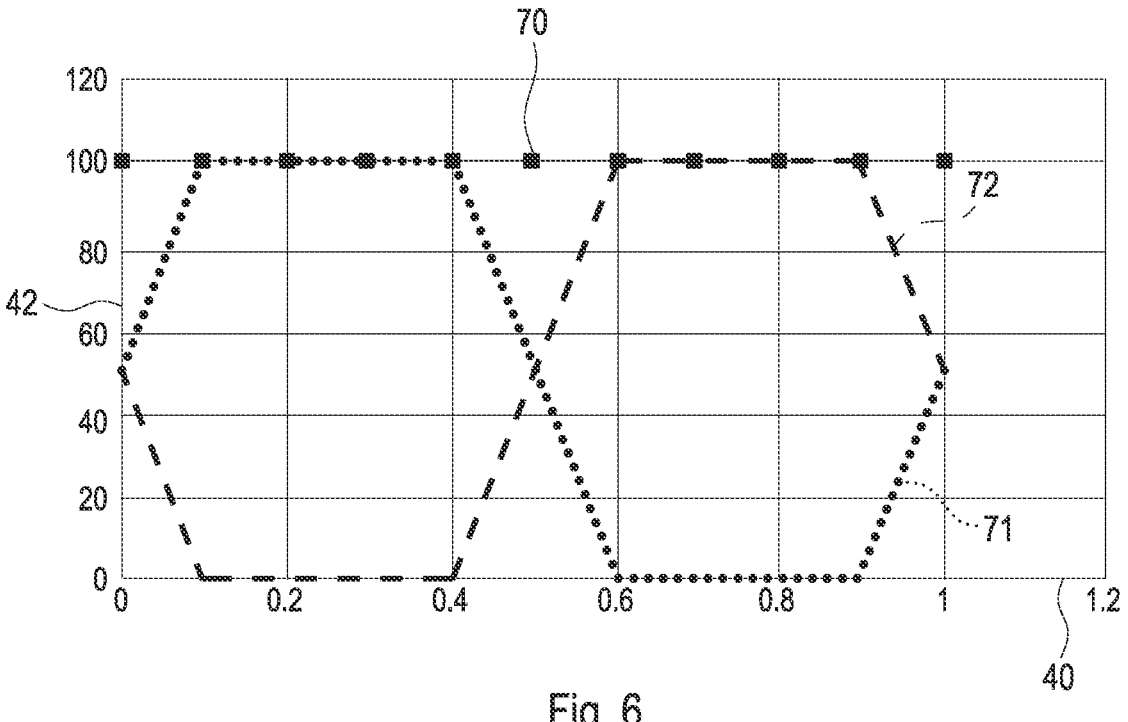
FIG. 6 shows a diagram including a third variant of torque curves.

Such torque values are shown in diagrams in FIGS. 4, 5 and 6. Each diagram of FIGS. 4, 5, and 6 contains an abscissa 40, along which normalized time is plotted, and an ordinate 42, along which an absolute magnitude of torque is plotted. In some embodiments, a value 1 for the time corresponds to at most 5 to 10 seconds, such as one second or a fraction of a second, such as 0.1 second. A setpoint for the torque is represented in the diagrams of FIGS. 4, 5, and 6 by a curve 50, 60, 70 (solid line, with diamonds in curve 50 and squares in curve 70), a target value for the torque of the first of the two drive units 4a, 4b, 14a, 14b is represented by a curve 51, 61, 71 (dotted line), and a target value for the torque of the second of the two drive units 4a, 4b, 14a, 14b is represented by a curve 52, 62, 72 (dashed line).

In the primary driving mode, at each point in time only one of the two drive units 4a, 4b, 14a, 14b is activated and driven and the other drive unit is deactivated. Accordingly, only one of the drive units 4a, 4b, 14a, 14b is providing a torque with a target value larger in magnitude than zero, while the target values of the two drive units 4a, 4b, 14a, 14b have the same curve 51, 52, 61, 62, 71, 72 and are equal and/or constant, including while the torque is switched, distributed, and/or displaced between the drive units 4a, 4b, 14a, 14b internally within the axle and/or spanning the axles and is switched back and forth between the two drive units 4a, 4b, 14a, 14b. Both the drive unit 4a, 4b, 14a, 14b being activated and the drive unit being deactivated may have, at the same time, a torque with a value between zero and the target value. Such a switching in the primary driving mode may differ from the secondary driving mode, in that both drive units 4a, 4b, 14a, 14b may be activated and a target value for the torque greater in magnitude than zero may be set for both drive units at the same time in such a case, while the target values of the two drive units 4a, 4b, 14a, 14b may be equal in the secondary driving mode.

As shown in the first variant for torque curves 50, 51, 52 in the diagram of FIG. 4, the torque may be digitally distributed between the drive units 4a, 4b, 14a, 14b and displaced from one drive unit 4a, 4b, 14a, 14b to the other. At each moment of time, only one drive unit 4a, 4b, 14a, 14b may be activated and provide a torque with the set target value (curve 51, 52), which also corresponds to the setpoint (curve 50). In the embodiment shown in FIG. 4, the curves 51, 52 may be idealized as rectangular.

In some embodiments, an overlapping in a digital distri-bution of the torque may occur in the primary driving mode, dependent on the operation, as it may not be possible to activate instantaneously and completely a drive unit 4a, 4b, 14a, 14b during a switching process, or to deactivate a drive unit 4a, 4b, 14a, 14b completely. The torque of a drive unit 4a, 4b, 14a, 14b during a respective switching may have a value between the target value and zero at least during a transition period between two action periods. Such a con-figuration is shown in the diagram for the second variant of torque curves 60, 61, 62 in FIG. 5. Such a configuration may result in a ramp during said transition period for each torque curve 61, 62, even when digitally distributed between the drive units 4a, 4b, 14a, 14b, while the torque curve 61, 62 may increase from zero to the target value upon activating the respective drive unit 4a, 4b, 14a, 14b when the electric machine is being operated as an electric motor, or accord-ingly the torque curve 61, 62 may decrease to zero when the electric machine is being operated as an electric generator. Upon deactivating of the respective drive unit 4a, 4b, 14a, 14b, the torque may decrease from the target value to zero. During each switch, the torque may change briefly during the transition period.

Alternatively or additionally, the torque may be distrib-uted between the drive units 4a, 4b, 14a, 14b, such as in the embodiment shown in the third variant of FIG. 6 for curves 70, 71, 72. In such embodiments, the target value (curve 71, 72) may be set for the torque of each drive unit 4a, 4b, 14a, 14b during the action period and may be greater in magni-tude than the setpoint for the torque (curve 70), and may otherwise be zero. In some embodiments, the curves may be rectangular. The torque of the two drive units 4a, 4b, 14a, 14b may be zero at the same time during a transition period and a pause between every two action periods, but since a respective target value is generally greater in magnitude than the setpoint, a resulting actual value of a combined torque corresponds to the intended setpoint. The blending during the transition period or pause as shown in FIG. 6 may result in less vibrations in the vehicle and minimal losses of efficiency as compared to a digital switching and/or dis-placement of the torque.

The action and transition periods described with the aid of the diagrams may have a length of a fraction of a second.

German patent application no. 10 2023 102323.3 filed Jan. 31, 2023, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for driving wheels of at least one axle of a vehicle, comprising:

dictating a setpoint for a torque to be provided by at least one drive unit for a given operating range, wherein the at least one drive unit is selected from a first drive unit and a second drive unit, the first and second drive units being associated with the at least one axle;

verifying a driving mode in which a better efficiency is achieved for the given operating range, wherein the driving mode is selected from a first driving mode and a second driving mode; and driving the wheels in the driving mode in which the better efficiency is achieved for the given operating range, wherein the wheels in the first driving mode are driven by only one of the first and second drive units, wherein the wheels in the second driving mode are driven by both the first and second drive units, and wherein the torque to be provided by the at least one drive unit for a given operating range is distributed evenly among the wheels of the at least one axle in both of the first and second driving modes.

2. The method according to claim 1, further comprising determining an available torque in advance of dictating the setpoint for the torque for each operating range of a plurality of operating ranges of the vehicle for each of the first and second driving modes.

3. The method according to claim 1, wherein only one drive unit of the first and second drive units of the at least one axle is activated at one time during the first driving mode.

4. The method according to claim 1, further comprising selecting the driving mode of the first and second driving modes based on a positioning of an operating point in a characteristic map for the torque for the given operating range relative to a center line of the characteristic map, wherein the characteristic map for the torque for the given operating range, represents the torque as a function of the rotary speed, wherein the characteristic map includes multiple characteristic curves, each characteristic curve being provided for a constant efficiency, and wherein the center line represents a best efficiency and is drawn through the characteristic curves.

5. A drive system for driving wheels of at least one axle of a vehicle, the drive system comprising:

a computing unit configured to drive the wheels of the at least one axle in one of a first driving mode and a second driving mode and to verify a driving mode of the first and second driving modes in which a better efficiency is achieved for a given operating range, wherein the at least one axle is associated with a first drive unit and a second drive unit, wherein only one drive unit of the first and second drive units drives the wheels in the first driving mode and both the first and second drive units drive the wheels in the second driving mode, wherein for a given operating range of the vehicle a setpoint is dictated for a torque which is to be provided by at least one drive unit of the first and second drive units, wherein the wheels are driven in the driving mode in which the better efficiency is achieved in the given operating range, and wherein the torque to be provided by the at least one drive unit for a given operating range is distributed evenly among the wheels of the at least one axle in both of the first and second driving modes.

6. The drive system according to claim 5, comprising the first and second drive units.

7. The drive system according to claim 6, wherein each of the first and second drive units comprises an electric machine and an inverter.

8. The drive system according to claim 5, wherein a drive unit is arranged on the at least one axle next to a respective wheel.

9. The drive system according to claim 5, wherein a drive unit is arranged in a wheel hub of a respective wheel.

* * * * *